(12) United States Patent
Dayton et al.

(10) Patent No.: US 7,881,976 B2
(45) Date of Patent: Feb. 1, 2011

(54) APPARATUS, METHODS AND SYSTEMS FOR DISCOUNTED REFERRAL AND RECOMMENDATION OF ELECTRONIC CONTENT

(75) Inventors: Sky Dayton, Santa Monica, CA (US); Daniel Sakai, Culver City, CA (US)

(73) Assignee: Virgin Mobile USA, L.P., Warren, NJ (US)

( * ) Notice: Subject to any disclaimer, the term of this patent is extended or adjusted under 35 U.S.C. 154(b) by 714 days.

(21) Appl. No.: 11/904,539

(22) Filed: Sep. 27, 2007

(65) Prior Publication Data
US 2009/0089177 A1    Apr. 2, 2009

(51) Int. Cl.
*G06Q 30/00* (2006.01)
(52) U.S. Cl. .................. 705/26; 705/14.16; 705/14.23
(58) Field of Classification Search ............... 705/26, 705/14.16, 14.23
See application file for complete search history.

(56) References Cited

U.S. PATENT DOCUMENTS

| 7,039,613 | B2 |   | 5/2006 | Stefik et al. |
| 7,255,267 | B2 | * | 8/2007 | Chao ..................... 235/380 |
| 2002/0077988 | A1 | * | 6/2002 | Sasaki et al. ............... 705/59 |
| 2003/0191816 | A1 |   | 10/2003 | Landress et al. |
| 2004/0128197 | A1 | * | 7/2004 | Bam et al. ................ 705/14 |
| 2005/0038707 | A1 |   | 2/2005 | Roever et al. |
| 2006/0095792 | A1 | * | 5/2006 | Hurtado et al. ............ 713/189 |
| 2006/0190290 | A1 |   | 8/2006 | Gomez |
| 2006/0212401 | A1 | * | 9/2006 | Ameerally et al. ........... 705/51 |
| 2007/0043651 | A1 |   | 2/2007 | Xiao et al. |
| 2007/0112636 | A1 | * | 5/2007 | Lucker ................... 705/26 |
| 2007/0265921 | A1 | * | 11/2007 | Rempe et al. ............. 705/14 |

OTHER PUBLICATIONS

Han, Peng (2006). Distributing digital product in peer-to-peer network: The diffusion process and the optimal referrals. Ph.D. dissertation, University of Washington, United States—Washington. Retrieved Sep. 7, 2010, from ABI/INFORM Global.(Publication No. AAT 3224228).*

* cited by examiner

*Primary Examiner*—Bradley B Bayat
*Assistant Examiner*—Courtney Stopp

(57) ABSTRACT

Apparatus, methods and systems for sharing and distributing electronic content using a mobile device are presented. In more specific terms, a viral marketing-based, discounted referral and recommendation model by which users may forward electronic content to other users in disclosed. In one aspect, a method of distributing electronic media content over a network includes displaying a discounted offer on a first device that has been transmitted from another device for which the electronic media content has been purchased. A notification is then received, and upon receiving an acceptance from the first device, the electronic media content is transmitted to the device.

13 Claims, 7 Drawing Sheets

APPARATUS, METHODS AND SYSTEMS FOR DISCOUNTED REFERRAL AND RECOMMENDATION OF ELECTRONIC CONTENT

FIELD OF THE INVENTION

The present invention relates generally to transmission and distribution of electronic content in a telecommunications network and more particularly to apparatus, methods and systems for sharing and distributing electronic content using a mobile device.

BACKGROUND OF THE INVENTION

As mobile communications have proliferated, the versatility of mobile electronic devices has correspondingly increased. In addition to electronic communications such as voice, text, picture or video messages, users may enjoy various forms of digital or electronic content including audio works, such as music, and video works, including movies and home videos on their mobile devices. Users can enjoy these forms of media in a variety of locations, including home, work and while on travel. As a result, there is enormous demand for electronic content on mobile devices for entertainment or other purposes.

Presently, electronic content is delivered from a content provider or distributor to mobile devices in various formats such as, for example, MP3 format for digital audio playback. As a result, users are limited to purchasing and downloading electronic content directly from a content provider. Electronic content may be delivered in an unprotected or encrypted manner. Alternatively, electronic content may be protected using conditional access (CA) or digital rights management (DRM) technologies. However, traditional sales models, as applied to delivery of electronic content, are not equipped to meet growing industry challenges. For example, despite content protection technologies, music industry label companies increasingly face the menace of digital piracy that contributes substantially to declining sales. Thus, a need exists for a viral marketing-based, discounted referral and recommendation model to manage the authorized distribution of electronic content among multiple mobile devices.

SUMMARY OF THE INVENTION

Embodiments of the present invention provide apparatus, methods and systems for sharing and distributing electronic content using a mobile device. In more specific terms, embodiments of the present invention relate to a viral marketing-based, discounted and recommendation model by which users may forward electronic content to other users.

In one aspect, the present invention relates to a method of distributing electronic media content over a network. In an embodiment of the present invention, the method includes displaying a discounted offer on a first device that has been transmitted from another device for which the electronic media content has been purchased. A notification is then received, and upon receiving an acceptance from the first device, the electronic media content is transmitted to the device.

In some embodiments, the present invention relates to a method of sending and receiving electronic media content to a device. The method includes presenting a first user with a first option on a display on a first device. The first option includes an offer to purchase electronic media content. A second option is also presented to the first user including an offer to purchase the electronic content media for another user. A third option is also presented to the user on the display including a request to another user to purchase the electronic media content for the first user. Upon selection of the first option by the first user, the electronic media content is then transmitted to the first device. If the second option is selected, a notification is transmitted to the second user. If the third option is selected, an informational object including the request is transmitted to the second user.

In another aspect, the present invention relates to a method of generating revenue from discounted distribution of electronic content. In an embodiment, the method includes advertising electronic content to a first user on a first mobile device and if the advertised content is purchased by the first user, soliciting a referral to a second user on a second mobile device from the first user using the first mobile. The method further includes the step of advertising a discounted purchase price for the electronic content to the second user in response to the referral.

In another embodiment of the invention, a mobile device is presented. The mobile device including an input device configured to send a signal, a processor, configured to receive the signal and a display configured to display a plurality of informational objects and a plurality of graphic user interface screens to a user in response to actuation of the input device. The plurality of informational objects may include a discounted offer to receive electronic media content based on the transmission of informational object from another user.

In another embodiment, a system of viral distribution of electronic media content is presented. A first mobile device is adapted to communicate with a server over a wireless network. An informational object, transmitted to the first mobile device over the wireless network, includes a plurality of options. The first option includes a discounted offer to purchase the electronic media content. The second option includes an offer to purchase the electronic content for a second mobile device and a third option includes transmitting a request to another user to purchase the electronic media content for the first mobile device. The system also includes a server adapted to communicate over the wireless network. The server receives a selection of one of the options from the first mobile device and operates on the electronic media content in according to the selection of one of the options by the mobile device.

BRIEF DESCRIPTION OF THE DRAWINGS

These embodiments and other aspects of this invention will be readily apparent from the detailed description below and the appended drawings, which are meant to illustrate and not to limit the invention, and in which.

DETAILED DESCRIPTION OF THE PREFERRED EMBODIMENTS

Figure 1:
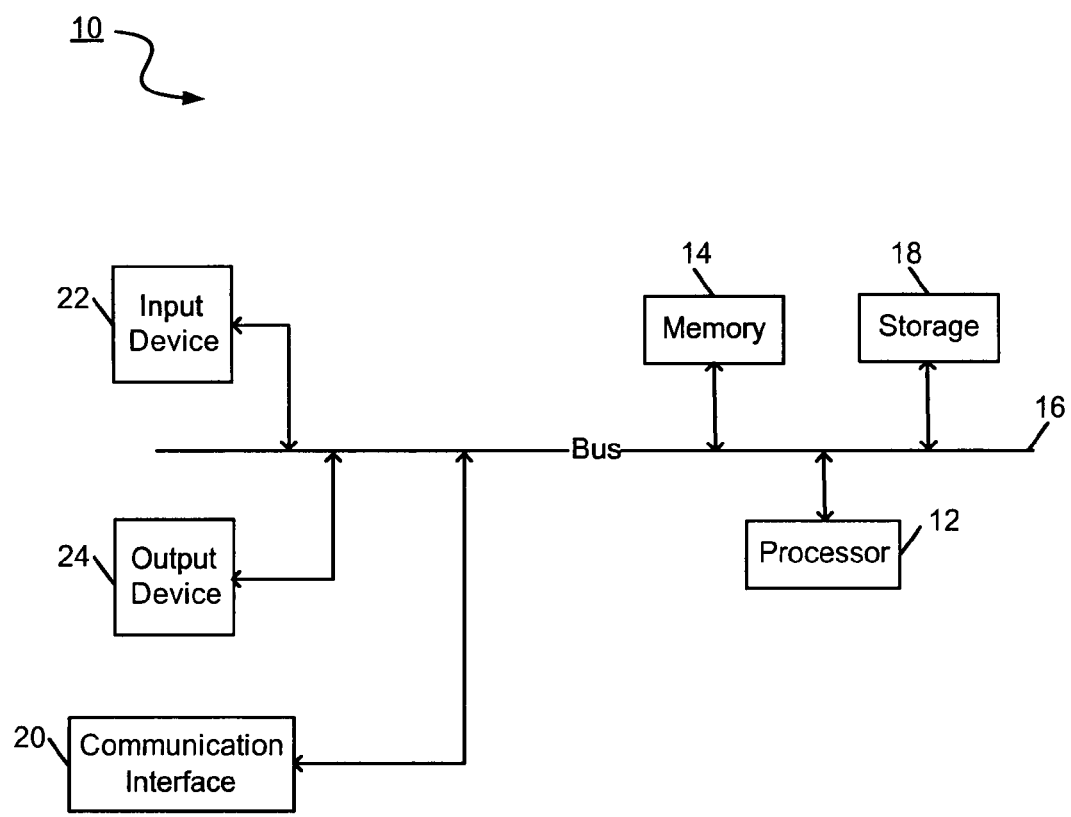
FIG. 1 is a functional block diagram that illustrates the components of an exemplary system for practicing an embodiment of the present invention.

The present invention will be more completely understood through the following detailed description, which should be read in conjunction with the attached drawings. In this description, like numbers refer to similar elements within various embodiments of the present invention. Within this detailed description, the claimed invention will be explained with respect to preferred embodiments. However, the skilled artisan will readily appreciate that the methods and systems described herein are merely exemplary and that variations can be made without departing from the spirit and scope of the invention.

Embodiments of the present invention relate to apparatus, methods and systems for sharing and distributing electronic content using a mobile device. An embodiment of the present invention relates to a recommendation model in which the user is presented with the option of recommending electronic content to other users. In some embodiments, the user may be presented with the option of recommending electronic content to another user following purchase of the electronic content or while browsing an online store.

In another embodiment, the present invention relates to a "gift" feature by which a user may send prepaid electronic content, or a link thereto, to other users on the mobile network. In various embodiments, the present invention relates an ask-buy model implementing a "beg" feature by which the user may request electronic content from other users. In such an embodiment, the user may send a request for the electronic content to a friend or peer on the mobile network. The other user may respond to the request by forwarding the content, or a personalized link to the content, for purchase at a discounted rate. In one embodiment, the discounted rate can range from greater than about 0% to about 100%. More particularly, in a preferred embodiment the discounted rate can range from about 25% to about 80%. In one specific embodiment the discounted rate is about 50%.

In some embodiments, the present invention relates to a viral marketing based distribution model by which users may forward electronic content to other users. In such an embodiment, the distribution of electronic content takes place directly from one user to another through peer-to-peer networking of mobile devices. In some embodiments, DRM protections are retained, while in others the content is not restricted by DRM limitations. Accordingly, special community features such as recommendations, collaborative filtering, and affinity matching may be implemented.

In the following discussion of illustrative embodiments, a "mobile device" includes, without limitation, mobile phones, remote control devices, personal digital assistants, hand-held computers, ultra-mobile personal computers, and the like. The term "softkey" includes, without limitation, a hard key without a fixed function, or alternatively, a virtual or screen button that appears on a touch screen. In either configuration, softkeys may be programmed to perform dynamic functions. The term "user" refers to an individual using a mobile device. The term "automatically" means without human intervention. The term "informational object" refers to information, in any form, than can be either directly or indirectly associated with an individual including, but not limited to, email, audio, video, pictures, and text messages. The term "electronic content", as used herein, refers to all electronic media including, but not limited to, digital audio, digital video, pictures, icons, text, avatars, ringtones, ringback tones, etc.

The term "idle mode" or "idle state" refers to the default device state when the mobile device is switched on or when the user is not navigating to a particular function, nor actively using a particular application. The term "contact," as used herein, generally includes information that corresponds to a contact and that may be considered relevant for identifying, contacting, accessing, corresponding or communicating with the contact. More generally, a "contact" can be any information corresponding to a person or a business. The term "application mode" as used herein, generally refers to a processor or memory state, or a type of user interface or screen displayed when a user is using a particular application or software. The term "device mode" as used herein, generally refers to a processor or memory state, or a type of user interface or screen displayed when the mobile device is in an idle state, or when a user is navigating to a menu, a specific application or function on the mobile device.

Embodiments described herein include a system of content distribution and viral marketing in which digital or electronic content is passed between users, allowing a much wider and faster spread of media content such as music, text and video. Thus, if a first user buys a song, but is associated with a group of friends, although the song may be sold to each of the friends at a discounted rate, the volumes of additional sales compensates. To the extent full price sales would not happen, or to the extent that piracy consumes revenue, a discounted mobile device based distribution model can operate to enhance revenue in the recording and other content distribution industries using the techniques and systems disclosed herein.

FIG. 1 is a functional block diagram that illustrates the components of an exemplary mobile device 10 for practicing an embodiment of the present invention. The mobile device 10 preferably includes a processing unit 12, a system memory 14, storage 18, a communication interface 20, an input device 22, an output device 24, and a system bus 16. The system bus 16 couples system components including, but not limited to, the system memory 14 to the processing unit 12. The processing unit 12 can be any of various available processors.

The input device 22 may be a keyboard, thumbboard, or touchscreen (for use with a stylus) that are used to receive data from a user. In addition, the input device 22 can also include a plurality of other inputs or controls for adjusting and configuring one or more aspects of the present invention including voice commands. The output device 24 may be a display device, such as an LCD or LED display screen, that can display one or more display objects (not shown) such as configurable icons, buttons, input boxes, menus, tabs, softkey labels and so forth having multiple configurable dimensions, shapes, colors, text, data and sounds to facilitate operations with mobile device 10. In certain embodiments a softkey or input button may be dedicated to perform certain actions such as "gifting" or "begging" as each is described in detail below.

The communication interface 20 facilitates data exchange over a variety of wireless networks. The hardware and software necessary for connection to the communication interface 20 includes, for exemplary purposes only, internal and external components that transmit and receive data wirelessly across a plurality of standard protocols including, for example, PCS, GSM, CDMA, Bluetooth, WiFi, IRDA, WiMAX, WiBRO or through other known wireless standards.

Storage 18 may include removable or fixed, volatile or non-volatile or permanent or re-writable computer storage media. The computer readable medium can be any available medium that can be accessed by a general purpose or special purpose mobile device. By way of example, and not limitation, such a computer readable medium can comprise flash memory, RAM, ROM, electrically erasable programmable read only memory (EEPROM), optical disk storage, magnetic disk storage or other magnetic storage devices, or any other medium that can be used to store digital information on a mobile device.

It is to be appreciated that FIG. 1 describes software that acts as an intermediary between users and the basic resources described in the mobile device 10. Such software preferably includes an operating system. The operating system, which can be resident in the storage 18, acts to control and allocate resources of the mobile device 10. System applications take advantage of the management of resources by the operating system through program modules and program data stored either in the system memory 14 or on the disk storage 18. Furthermore, it is to be appreciated that the present invention can be implemented with various operating systems or combinations of operating systems.

The computer readable medium tangibly embodies a program, functions, and/or instructions that cause the computer system to operate in a specific and predefined manner as described herein. Those skilled in the art will readily appreciate, however, that the process described below may be implemented at any level, ranging from hardware to application software and in any appropriate physical location. For example, the present invention may be implemented as software code to be executed by the mobile device 10 using any suitable computer language and may be stored on any of the storage media described above, or can be configured into the logic of the mobile device 10. Such software code may be executed by the mobile device 10 using any suitable computer language such as, for example, Java, Javascript, C++, C, C#, Perl, Visual Basic, Transact/Structure Query Language (T/SQL), database languages, APIs, various system-level SDKs, assembly, firmware, microcode, and/or other languages and tools.

Figure 2:
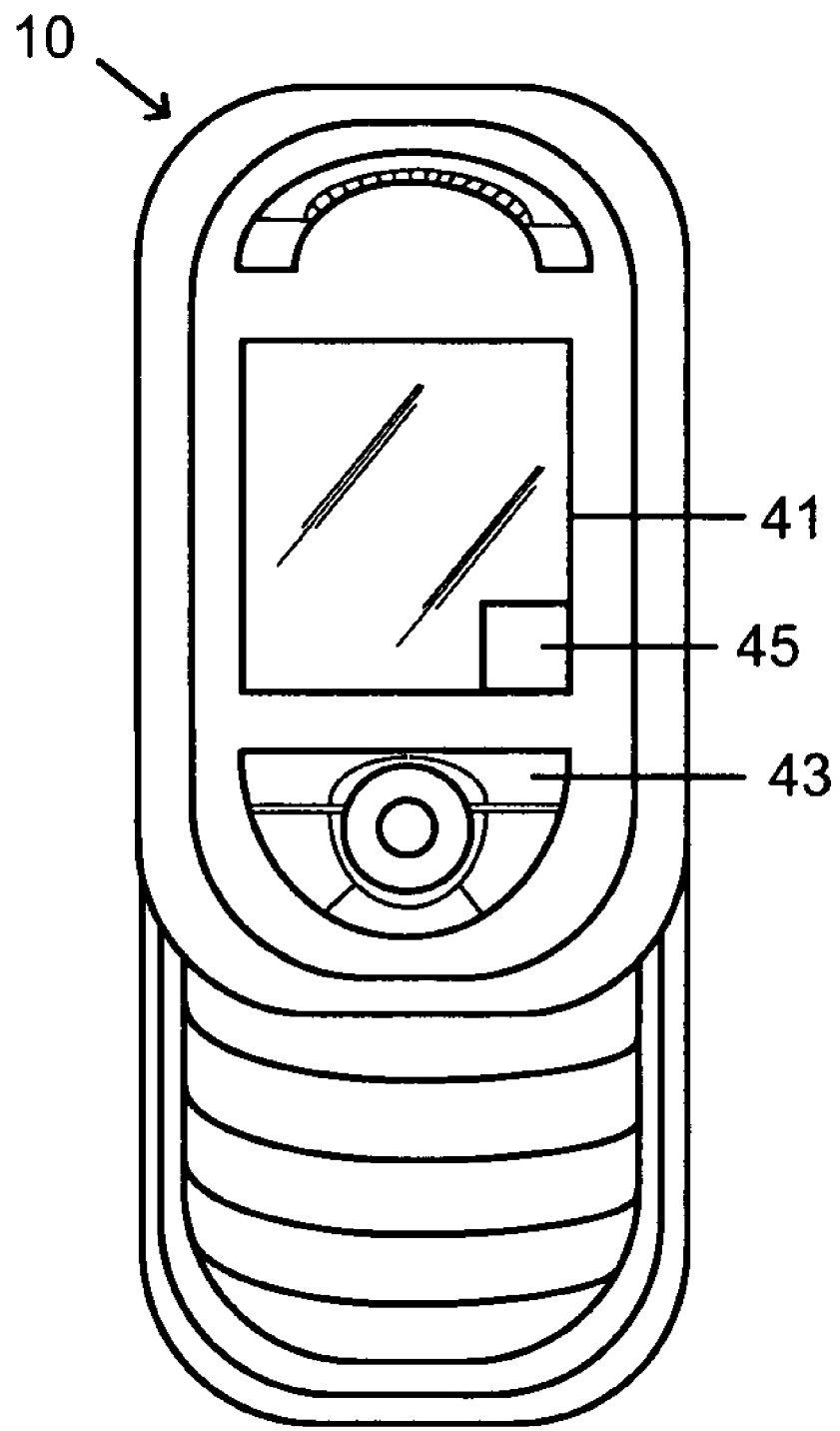
FIG. 2 is a schematic diagram that illustrates mobile device for sharing and distributing electronic content according to an embodiment of the present invention.

FIG. 2 is a schematic diagram that illustrates a mobile device 10 for sharing and distributing electronic content according to an embodiment of the present invention. Mobile device 10 includes an input device such as a keypad 44 with individual keys for entering characters, numbers, or symbols. Typically, a user interacts with a content store or other interface displayed on the screen of the device 10 to purchase content, recommend content, request content, or transmit messaged relating to the same. Typically, an interface screen specific to the content distribution techniques and system described herein is present to the user and interacted with using an input device of the mobile device.

In addition, the mobile device 10 can include a softkey label 45 drawn on a display screen 41 adjacent to the softkey 43, so that the function and action associated with the softkey may be readily defined and re-defined according to the particular state of the user interface. In one embodiment, when pressed or otherwise activated, the softkey 43 causes the mobile device 10 to display a user interface for initiating a search and subsequent purchase of electronic content. In such an embodiment, the mobile device 10 may be configured to automatically sort and cache results following a search for electronic content. The user may then activate the softkey 43 or other inputs to display the results.

Although the embodiments illustrated herein include a softkey as a mechanism for initiating a content purchase, discounted referral, or other content distribution specific interaction, virtually any mechanism configured to capture a user command such as, for example, voice command, touch screen or keypad navigation, whether displayed or not, can be used to initiate such a content distribution specific event without departing from the principles of the invention.

In general, the present invention relates to the content distribution of digital or electronic media content. In one embodiment, a viral scheme of distributing discounted content to a peer group is used to increase sales volume and counteract content piracy. In such an embodiment, a recipient user may be provided with the opportunity to purchase the electronic content at a discount. As a result, user experience is enhanced during purchase and download of the electronic media content. In certain embodiments mobile devices may be branded or bundled with a variety of service providers, such as online communities including My Space and Facebook. The use of a branded mobile device among a cohort of users provides the users with a convenient means of accessing contacts, messages, favorite media (including but not limited to music) and other information retained in or on the user's online account or web pages.

An exemplary mobile device 10 may be configured to recommend or share electronic content with other devices on the mobile network. In some embodiments, the mobile device 10 may be further configured to provide special community features such as collaborative filtering, and affinity matching. Content providers, service providers, or content right-of-use sales centers may deduct the cost of the electronic content from an account associated with the registered data of the user of the mobile device 10. This facilitates a transparent interaction that increases impulse purchasing and the use of a mobile device as the preferred content purchasing channel.

Figure 3:
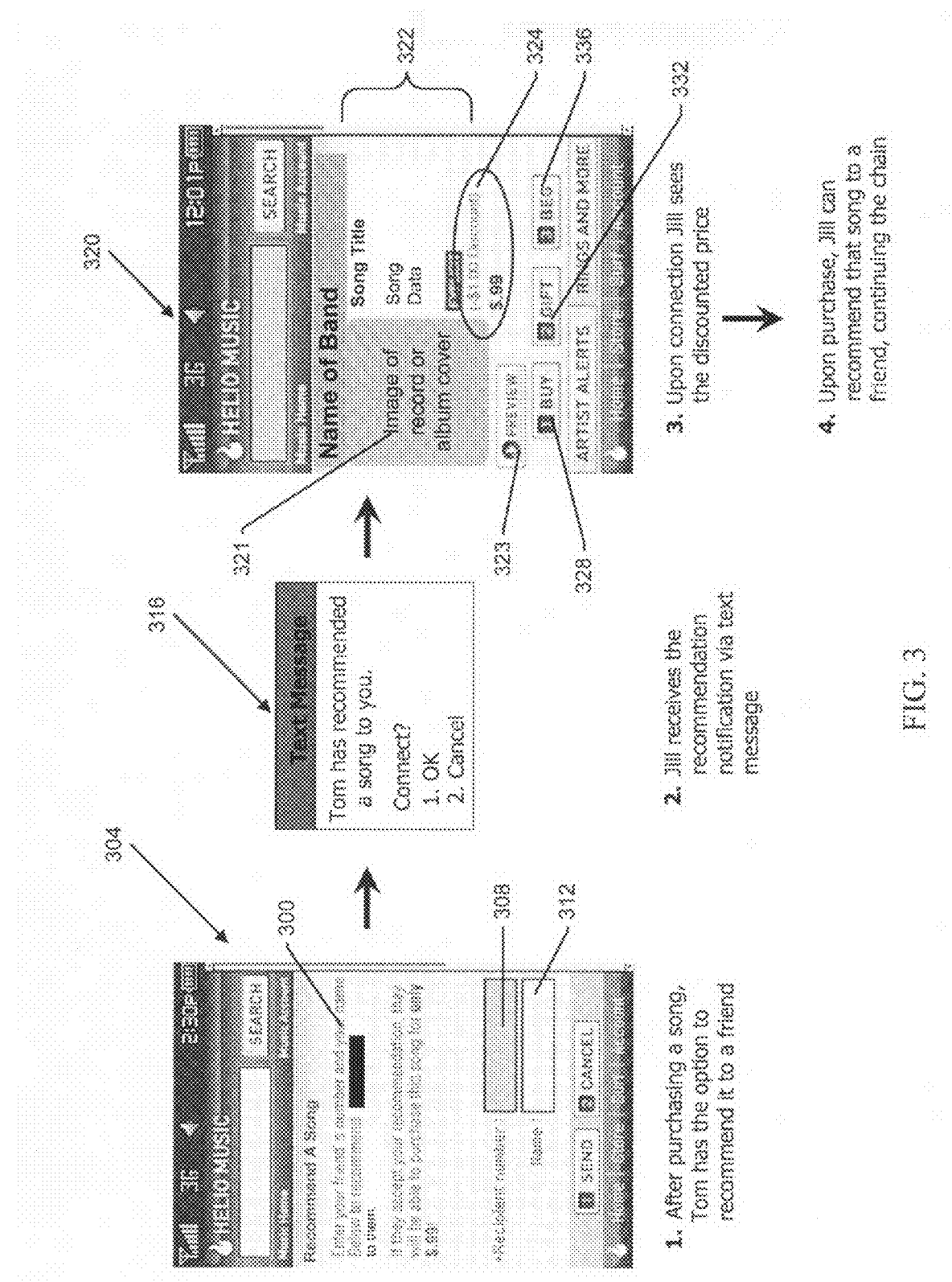
FIG. 3 is a high-level flow diagram that illustrates distribution of exemplary electronic content by a recommendation model in accordance with an embodiment of the present invention.

FIG. 3 is a high-level flow diagram that illustrates distribution of exemplary electronic content 300 by the recommendation model in accordance with an embodiment of the present invention. A user, Tom, of a mobile device may be presented with the option of recommending the electronic content 300, in this example, a song, to a friend, Jill, after having purchased and downloaded the electronic content 300. In an embodiment of the present invention, the electronic content 300 may be downloaded in its entirety in a digital format, or previewed by streaming over the mobile network. In another embodiment, a link to preview or download the electronic content 300 may be accessed in an online "locker" designated for Tom. In such an embodiment, Jill may also purchase and download the electronic content 300 via a link in Tom's designated locker. Jill may also be able to browse Tom's designated locker for other media content. Typically, in one embodiment, Jill receives an informational object such as a text message that facilitates the downloading or preview streaming from a third party service, such as an online music store. In one embodiment, the online music store is integrated as part of the mobile device's graphic user interface.

In certain embodiments, Jill may be able to purchase any of the content in Tom's locker at a discounted rate. The user may have the option of restricting access to certain users by granting permissions, e.g. a public/private setting or requiring passwords or access codes. Additionally, the user may create a separate shared playlist page, the contents of which may be viewable to other users.

As shown, Tom may recommend the electronic content 300 to Jill by entering her details in the user interface of the mobile device. A recommendation notification of the electronic content 300 may be conveyed to Jill through various mechanisms including, but not limited to text, picture or voice messages. Alternatively, the user interface of the mobile device may continually poll an on-board queue specifically configured to receive and dispose such events at regular intervals, for example, 500 ms.

In one embodiment the user interface of the mobile device may be integrated with the devices phone book or the contact list of a web-based addressed book. For example, Tom may be able to browse the phonebook on his mobile device or find a contact stored in a web-based service provider account in order to send the recommendation notification. The mobile device may import the phone number or email address of the contact in order to send the notification. Integration of the phonebooks and contact lists provides an easier way of showing in-network contacts who may be eligible for the discount.

In the display screen 304, Tom is prompted to recommend the electronic content 300 to a friend. Those skilled in the art will readily recognize that a variety of ways to designate a recipient may be implemented on the mobile device 10. For example, Tom may provide Jill's phone number in a textbox 308 and her name in a textbox 312. Alternatively, Tom may select Jill's information from a contacts list or phone book. In an embodiment of the present invention, Tom may also send the recommendation for the electronic content 300 to multiple recipients.

In the display screen 316, Jill is prompted by a text message indicating Tom's recommendation of the electronic content 300. As shown in one embodiment, Jill is presented with an option to connect to an online server to download the electronic content 300. In various embodiments of the present invention, Jill may directly connect to Tom's mobile device 10 using a standard protocol such as, for example, Bluetooth, to download the electronic content 300. However, in another embodiment, Jill accesses a third party content provider.

In the display screen 320, Jill is presented with information regarding the recommended electronic content 300. In various embodiments of the present invention, a variety of audio and visual elements may be employed to present information regarding the electronic content 300 on the display screen 320. Accordingly, audio and visual elements may include, for example, an image of the album or song cover 321 of the electronic content 300, a description 322 of the electronic content 300 and a preview button 323 that provides Jill with the option of streaming a small portion of the electronic content 300.

As shown, Jill is also presented with the opportunity to purchase the electronic content 300 at a discounted price 324. Jill may take advantage of the opportunity by immediately selecting "buy" 328. As an example, consider the hypothetical scenario where Tom may have purchased electronic content directly from a content provider at $1.99. On receiving the recommendation notification from Tom, Jill may be able to purchase the electronic content 300 at a discounted price of $0.99. This purchase price can range from $0.00, in the event of a promotional distribution of content, to any suitable fraction of the purchase price of the content original paid by the recommender.

In an embodiment of the present invention, Jill may also be presented with the option of "gifting" the electronic content 300 to another user on the mobile network by selecting "gift" 332. In such an embodiment, Jill's account may be automatically billed for the electronic content 300, and a gift notification may be sent to the recipient user as described in further detail below. The gifted electronic content may also be subject to a discount. For example, after Jill has purchased the content at full price, she may gift the content a defined number of times to other users at a discount.

Alternatively, Jill may prefer to request the electronic content 300 from another user on the mobile network by selecting "beg" 336. In various embodiments of the present invention, Jill may request the electronic content 300 for purchase at a discounted price from a friend, peer, or any user on mobile electronic network. The friend or peer may be able to "gift" the electronic content 300 to Jill, in response to her request. In such a scenario, the friend or peer may be billed for the transaction. In other embodiments, a "refer" button or other suitable interface can be integrated with the mobile device to give the device's user the option of sending a recommendation about the content to a contact from the same interface screen.

In yet another embodiment of the present invention, an incentive program may be offered to further encourage referrals and recommendations. The incentive program may include the creation of an awards mechanism that gives users credit for every recommendation that results in a successful purchase. For example, if Tom recommends electronic content to Jill and Jill subsequently purchases the electronic content, Tom will receive a credit. In one embodiment, Tom may also receive credit if Jill is successful in recommending the electronic content to another user. Once the user amasses a sufficient number of credits, the user may redeem the credits for awards. Awards may include, without limitation, additional electronic content, merchandise, or other discounted offers.

Figure 4:
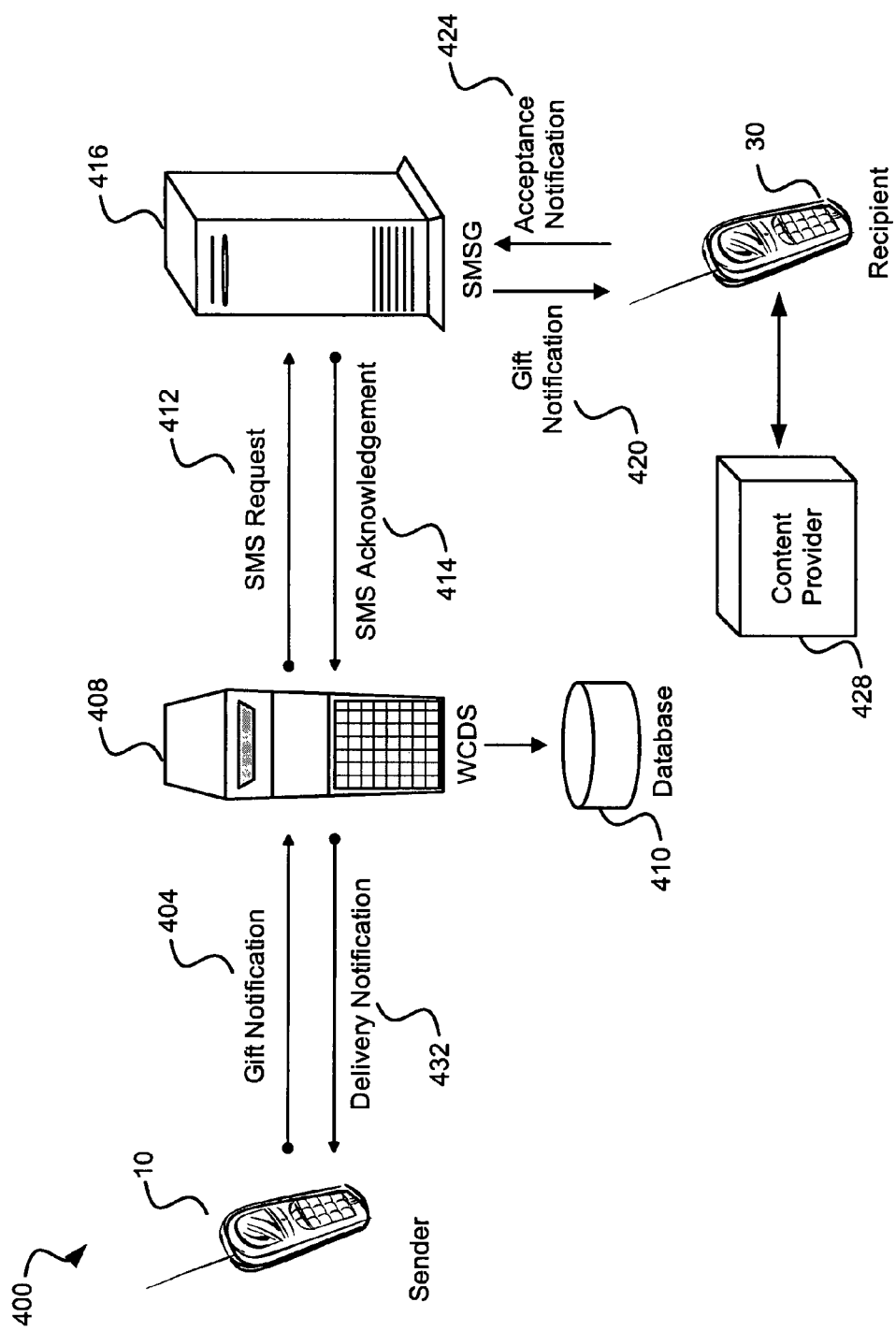
FIG. 4 is a high-level flow diagram that illustrates an exemplary "gifting" scenario in accordance with an embodiment of the present invention.

FIG. 4 is a high-level diagram that illustrates an exemplary "gifting" scenario 400 in accordance with an embodiment of the present invention. A user of the mobile device may wish to "gift" digital or electronic content to user of the recipient mobile device 30. As shown, the user of the mobile device 10 sends a gift notification 404 to a wireless communication device server 408. In an embodiment of the present invention, the mobile device 10 may send the gift notification 404 directly to the recipient mobile device 30 using a standard mobile communication platform such as, for example, IR or Bluetooth.

Those skilled in the art will readily recognize that various standard protocols for communication between the mobile devices 10, 30 and the wireless communication device server 408 may be implemented by the exemplary "gifting" scenario 400. For example, wireless Internet platform for interoperability (WIPI), a standard specification for mobile platforms made by the mobile platform special subcommittee of the Korea wireless Internet standardization forum (KWISF), may be used. These are standard specifications necessary for providing an environment for mounting and implementing applications downloaded via wireless Internet on the mobile devices 10, 30.

In various embodiments of the present invention, the wireless communication device server 408 may be implemented as a computer system and include processing units, memory units and I/O components. On receipt of the gift notification 404, the wireless communication device server 408 performs sending user and recipient user authentication. A record of each session is stored in a transaction log on the wireless communication device server 408 or an external database 410.

Following successful completion of the authentication process, the wireless communication device server 408 submits a request 412 to a short messaging service (SMS) gateway 416. The SMS gateway 416 sends an SMS acknowledgement 414 acknowledging receipt of the SMS request 412 to the wireless communication device server 408. Subsequently, the SMS gateway 416 forwards the gift notification 420 to the recipient mobile device 30. In an embodiment of the present invention, the SMS gateway 416 may forward a gift notification 420 using a call-back URL or text message notification.

As shown, the recipient mobile device 30 sends an acceptance notification 424 upon successful receipt and acceptance of the gift notification 420. The user of the recipient mobile device 30 may then be able to download the electronic content from a content provider 428. Accordingly, a delivery notification 432 is sent by the wireless communication device server 408 to the sender's mobile device 10. Alternatively, user of the recipient mobile device 30 may download the electronic content directly from the sending user's mobile device 10 or another designated source.

In various embodiments of the present invention, the user of the recipient mobile device 30 may also be provided with many other options, including, but not limited to, further gifting electronic content to another user on the mobile network, suspending download of the gifted electronic content to a later time and/or discarding or refusing the gifted electronic content.

In another embodiment of the present invention, the user of the recipient mobile device 30 may wish to further purchase additional content related to the gifted electronic content. For example, the user of the recipient mobile device 30 may have received a song, and wish to purchase the entire album. In such a scenario, the user of the recipient mobile device 30 may be presented with several additional options such as, for example, purchasing the album, purchasing a selection of songs from within the album and/or browsing the sending user's library or locker for other media content. Accordingly, the recipient user may also be able to designate the sending user's account for billing purposes, or pay for the purchase by designating his or her own account.

Figure 5:
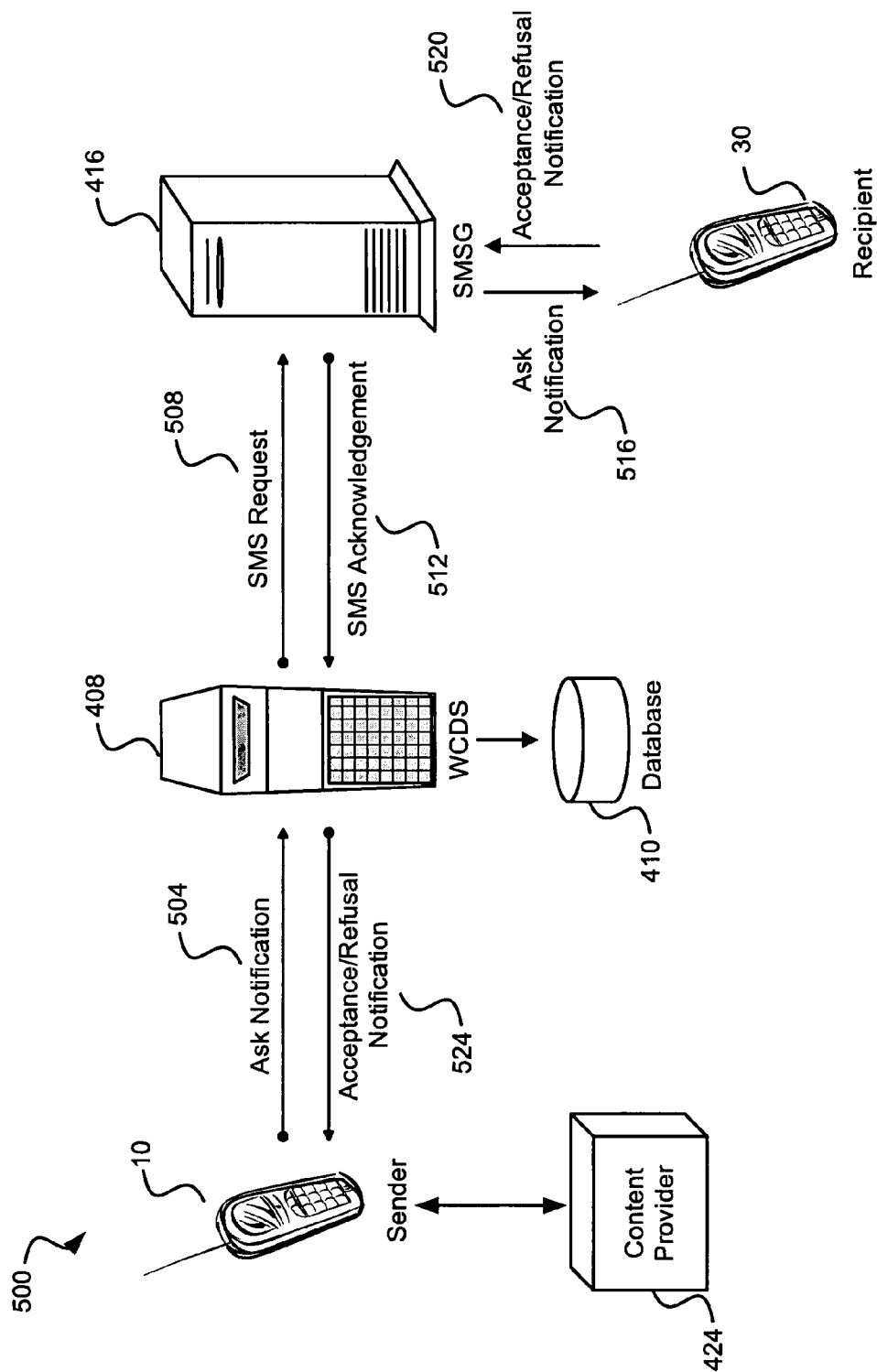
FIG. 5 is a high-level flow diagram that illustrates an exemplary ask-buy or "beg" scenario in accordance with an embodiment of the present invention.

FIG. 5 is a high-level diagram that illustrates an exemplary ask-buy or "beg" scenario 500 in accordance with an embodiment of the present invention. A user of mobile device 10 may wish to make a request or "beg" for digital or electronic content from one or more users on a mobile network. As shown, the user of mobile device 10 sends an ask notification 504 to the wireless communication device server 408. In an embodiment of the present invention, the mobile device 10 may send the ask notification 504 directly to the recipient mobile device 30 using a standard mobile communication platform such as, for example, IR or Bluetooth.

As described earlier, upon receipt of the ask notification 504 the wireless communication device server 408 may perform sending user authentication. Those skilled in the art will readily recognize that many verification and/or authentication routines may be performed by the wireless communication device server 408. For example, the wireless communication device server 408 may perform a check using a mobile station integrated services digital network (MSISDN) to verify if the user of the mobile device 10 has been barred from contacting a particular user and/or has exceeded a predetermined number of "beg" requests. Records of the ask notification session are stored in a transaction log on the wireless communication device server 408 or the external database 410.

The wireless communication device server 408 may then submit a request 508 to the short messaging service (SMS) gateway 416. Subsequently, the SMS gateway 416 sends an SMS acknowledgement 512 to the wireless communication device server 408 and forwards the ask notification 516 to the recipient mobile device 30. In various embodiments of the present invention, the SMS gateway 416 may also broadcast the ask notification 516 to multiple recipient mobile devices on the mobile network designated by the sending user. For example, the user of the mobile device 10 may have a list of designated "favorites," or contacts to which he or she may routinely broadcast such messages.

As shown, the user of the recipient mobile device 30 may send an acceptance notification 520 if he or she wishes to "give" the user of the mobile device 10 the requested electronic content. Alternatively, the user of the recipient mobile device 30 may send a refusal notification 520 if he or she does not have or wish to share the requested electronic content. Those skilled in the art will readily recognize that a variety of ways exist to handle ask, delivery and acceptance notifications in the exemplary ask-buy model 500. For example, the user of the recipient mobile device 30 may preferentially set the mobile device 30 to automatically reject all incoming ask notifications 516. In another embodiment of the present invention, the SMS gateway 416 may be configured to selectively forward multiple acceptance/refusal notifications 520. Accordingly, the user of the mobile device 10 may receive an acceptance/rejection notification 524 that is selectively forwarded by the wireless communication device server 408. In various embodiments of the present invention, the wireless communication device server 408 may only deliver acceptance notifications and discard refusal notifications.

Upon successful receipt of an acceptance notification 524, the user of the mobile device 10 may download the electronic content from a content provider 424. Alternatively, the user of the mobile device 10 may download the electronic content directly from the recipient user's mobile device 30 or another designated source.

In an embodiment of the present invention, the user of the recipient mobile device 30 may be billed for the "beg" or request transaction. In another embodiment, the cost of the transaction may be allocated among the users in accordance to a predetermined scheme. For example, the user of the mobile device 10 may prepay a predetermined portion of the transaction cost before forwarding the acceptance notification 520. Accordingly, user of mobile device 10 may then be billed the remaining amount. In one embodiment, the person responding to a beg request may receive a discount for a future content purchase. In another embodiment, the gifting or begging requests requires that a user make a referral to another user regarding a particular piece of content.

With respect to both of the scenarios depicted in FIGS. 4 and 5, referral systems and discounted distribution of content are integrated in both the ask and gift portions in various embodiments. For example, when an individual receives a beg request, they may be able to satisfy it at a discounted price based on their prior history with the online music store and/or their historic content transaction based relationship with the requestor. Similarly, when someone is gifting content, a discount may be automatically applied if the user giving the gifted content has already purchased the content for their own use.

Figure 6:
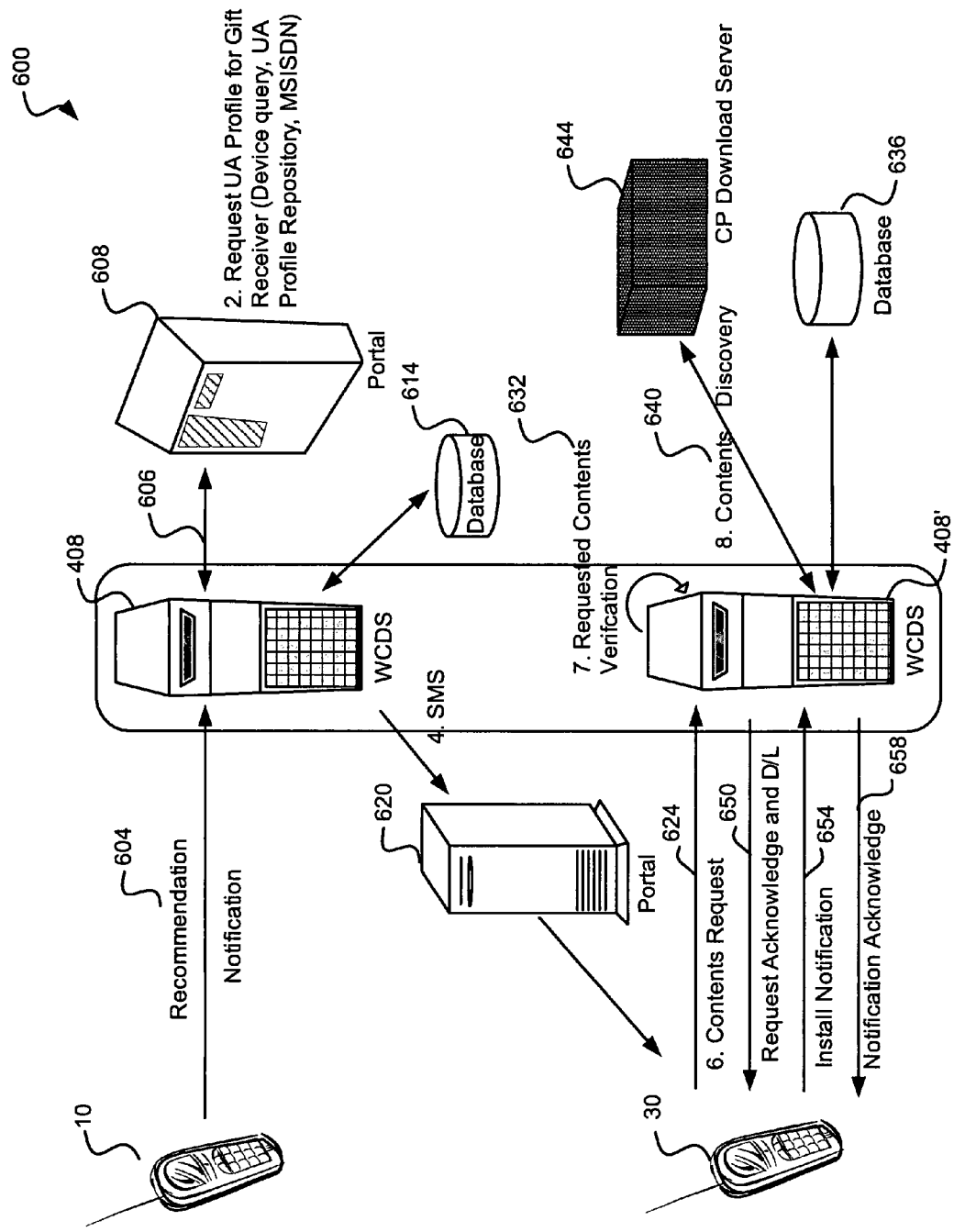
FIG. 6 is a high-level diagram that illustrates an exemplary distribution scenario in accordance with an embodiment of the present invention.

FIG. 6 is a high-level diagram that illustrates an exemplary distribution scenario 600 in accordance with an embodiment of the present invention. In such a scenario, a user of the mobile device 10 may wish to recommend digital or electronic content to another user of a mobile device 30 on the mobile network. As shown, the user of mobile device 10 sends a recommendation notification 604 to the wireless communication device server 408.

On receiving the recommendation notification 604, the wireless communication device server 408 queries 606 a portal interface server 608 for information regarding the user of the recipient mobile device 30. In an embodiment of the present invention, the wireless communication device server 408 may query the portal interface server 608 for a user agent profile (UA profile) of the recipient mobile device 30. In such an embodiment, the UA profiles are obtained by querying a profile repository which may be stored locally on the portal interface server 608 or on a remote terminal accessed by establishing a secure connection.

In some embodiments, the portal interface server 608 may also query a mobile station integrated services digital network (MSISDN) to identify the recipient mobile device 30. Those skilled in the art will readily recognize that various verification or authentication routines may be implemented on the portal interface server 608. For example, the profile interface server 608 may verify if the electronic content recommended by the user of the mobile device 10 is appropriate material for the user of the recipient mobile device 30.

On receiving the results of the query 606, wireless communication device server 408 forwards the recommendation notification 604 and related information to a database 614. In an embodiment of the present invention, such information may include the sender's name and telephone number, the recipient's name and telephone number, the type of the digital or electronic content recommended and other transaction details.

On successful authentication of the sender mobile device 10 and the recipient mobile device 30, the wireless communication device server 408 sends a notification 616 of the recommendation to the recipient mobile device 30. The notification 616 may be conveyed to the recipient mobile device 30 in a variety of ways known to those skilled in the art including, but not limited to text, picture or voice messages. As shown, the notification 616 may be conveyed using short messaging service (SMS). In an embodiment of the present invention, the notification 616 may be sent to via a second profile interface server 620.

Upon receipt of the notification 616, the user of the recipient mobile device 30 may accept the recommendation and initiate a content request 624. As shown, the content request 624 is conveyed to a second wireless communication device server 408' for processing. The content request 624 may be in the form of an initial download descriptor (DD). Alternatively, the content request 624 may contain a separate portion designated to describe the content. In an embodiment of the present invention, the DD portion may contain information on the content that is dynamically created by a content management system (CMS). The content request 624 may be in the form of a text, or text containing an XML form. In some embodiments of the present invention, wireless communication device server may perform additional content verification routines 632 based on information contained in the content request 624. For example, the wireless communication device server 408' may verify if the electronic content is compatible with the recipient mobile device 30. Alternatively, the wireless communication device server 408' may verify if the user of the recipient mobile device 30 has set special preferences for handling content delivery of the type contained in the content request 624.

In some embodiments, communication between the recipient mobile device 30 and the wireless communication device server 408' may be established using HTTP protocol. Accordingly, separate sessions may be initiated for each content request 624. In such an embodiment, a record for each session may be saved in a transaction log table on the wireless communication device server 408' or an external database 636.

Based on the information contained in the DD portion of the content request 624, the wireless communication device server 408' may be configured to determine if the electronic content may be found locally. In the event the electronic content does not exist locally, a request 640 for the content may be sent to an external content provider (CP) download server 644. Accordingly, the wireless communication device server 408' sends the request acknowledgement and download 650 to the recipient mobile device 30. The user of the recipient mobile device 30 may then begin downloading the electronic content.

In various embodiments of the present invention, the user of the recipient mobile device 30 may also be provided with a variety of options upon receipt of the request acknowledgement and download 650. For example, the user of the recipient mobile device 30 may opt to suspend download to a later time. Alternatively, the user of the recipient mobile device 30 may decide to store the content in a designated area on the wireless communications server 408' or another remote terminal for download at a later time. In such a scenario, the user's designated area, or library may be implemented on the remote terminal, for example, as a playlist of songs. Accordingly, the remote media storage device or terminal may not maintain a physical copy of the electronic content, but store a URL pointing to the electronic content. In yet another scenario, the user of the recipient mobile device 30 may wish to "gift" the recommended electronic content to another user on the mobile network. In such a scenario, the user of the recipient mobile device 30 may be billed for the electronic content at the discounted rate.

Embodiments of the invention may be implemented in both in-network and out-of network infrastructures. In one embodiment a closed network, or walled garden, may be implemented in which a central entity controls the circulation of all content, which may be encoded as a proprietary format or contain digital rights management unique to the network provider. The content is originated and maintained by the central entity such that it may not be shared or distributed on other network provider systems. In an alternative embodiment, an out-of-network infrastructure provides for an open network in which content may be distributed and maintained freely with no proprietary encoding or rights management.

In another embodiment, a user may recommend or gift electronic content to out-of-network members, including any discount. While in-network devices may include the communications and transactions infrastructure, out-of-network transactions may require the additional use of a local client or browser "plug-in" to assist in the transaction. A separate log-in system or account may be created by off-network users in which a mobile device may be registered and any application software needed for the device. The out-of-network account may be tied to a third-party payment provider, such as PayPal™, in order to ensure proper billing and collecting because the out-of-network user may not be able to communicate with the in-network billing system or protocol as described below.

In an embodiment of the present invention, when the download of the electronic content to the recipient mobile device 30 is complete, the recipient mobile device 30 sends an install notification 654 to the wireless communications device server. The wireless communication device server 408' responds with a notification acknowledgement 658 upon successful verification of the integrity of the downloading process. As shown, details of the transaction are recorded in a database 636 at the end of each session.

Figure 7:
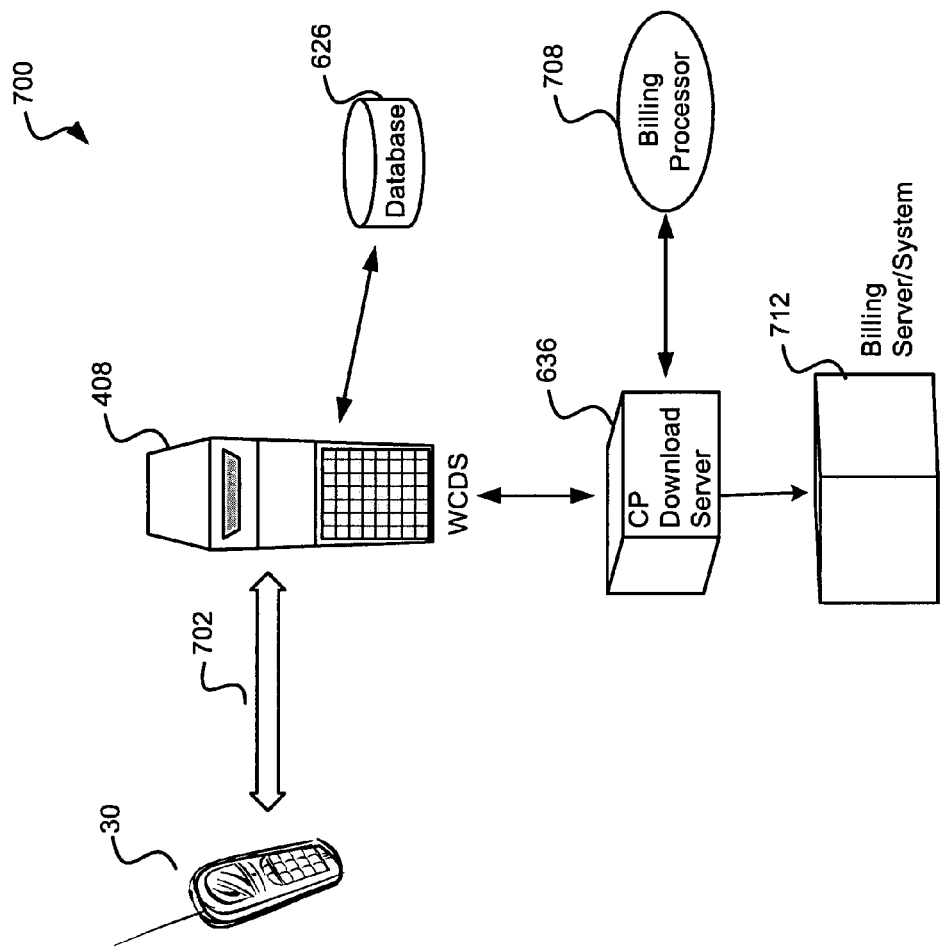
FIG. 7 is a high-level diagram that illustrates an exemplary billing mechanism for use in distribution scenario in accordance with an embodiment of the present invention.

FIG. 7 is a high-level flow diagram that illustrates an exemplary billing mechanism 700 for use in a distribution scenario in accordance with an embodiment of the present invention. As shown the recipient mobile device 30 performs a series of transactions 702 in communication with the wireless communication device server 408. The transactions 702 are sessions established under a standard protocol, for example, HTTP, by which the recipient mobile device 30 requests and receives the electronic content for download. A record of each session is stored in a transaction log on the wireless communication device server 408 or an external database 626.

As shown, a billing processor 708 periodically queries a CP download server 636 and database 626 to create a billing file. In various embodiments of the present invention, the billing processor 708 may be a computer system including a processor, memory and an I/O unit. In some embodiments, the billing processor 708 may be a microprocessor, for example a complex instruction set computer (CISC) microprocessor or a reduced instruction set computing (RISC) microprocessor.

In an embodiment of the present invention, the billing processor 708 determines the nature of the transaction. In a "gift" transaction, the billing processor 708 bills the sending user's account for the electronic content. In an ask-buy or "beg" model, the billing processor 708 bills the recipient user's account for the transaction. In various embodiments of the present invention, the recommendation based distribution transactions are billed at a discounted rate to the recipient user's account.

The CP download server 636 may further interface with a billing server/system 712. Content providers may be presented with a content registration screen on the billing server/system 712 to review transactions performed during a predetermined period. The billing server/system 712 may also periodically retrieve files created by the billing processor 708 and stored on the CP download server 636. In various embodiments of the present invention, billing files may be retrieved directly from the billing processor 708 or an external repository.

In another embodiment of the present invention, the exemplary billing mechanism 700 may provide the user of the mobile device 10 a "re-download" feature. In such an embodiment, the user of the mobile device 10 may download the electronic content without needing to navigate to a previously downloaded version. Accordingly, the user of the mobile device 10 may or may not be billed again by the content provider. In one embodiment, the network based systems described herein and in the figures include data capture modules for statistical analysis. Specifically, statistics relating to the monies generated using viral distribution and discounted sales can be accounted for separately to evaluate the benefits of certain discount rates and the overall distribution system.

Those of ordinary skill in the art will readily appreciate that the mobile device 10 is exemplary only and that the present invention can operate within a number of different mobile devices. Furthermore, various embodiments of the present invention described above may be implemented at any level, ranging from hardware to application software and in any appropriate physical location or operating system.

Variations, modifications, and other implementations of what is described herein will occur to those of ordinary skill in the art without departing from the spirit and scope of the invention as claimed. Accordingly, the invention is to be defined not by the preceding illustrative description but instead by the spirit and scope of the following claims.

The invention clamed is:

1. A method of distributing electronic media content comprising:
   receiving from a first mobile device a first notification that a user of the first mobile device purchased a piece of electronic media content using the first mobile device;
   responsive to receiving the first notification, providing an option to the user of the first mobile device for transmitting a discounted offer for the piece of electronic media content to others;
   receiving a second notification from the first mobile device that the user selected the option along with an identifier of a second mobile device;
   responsive to receiving the second notification, transmitting to the second mobile device the following options: the discounted offer for the piece of electronic media content, and an option to transmit the discounted offer to a third mobile device, wherein the discounted offer includes a request to purchase the piece of electronic media content for the second mobile device;
   upon receiving an acceptance notification from the second mobile device in response to the discounted offer, transmitting the piece of electronic media content to the second mobile device;
   upon receiving an acceptance notification from the second mobile device in response to the option to transmit the discounted offer to a third mobile device, transmitting the discounted offer to the third mobile device including the request to purchase the piece of electronic media content for the second mobile device; and
   responsive to receiving an acceptance notification from the third mobile device, transmitting the piece of electronic media content to the second mobile device.

2. The method of claim 1, wherein transmitting the discounted offer comprises transmitting a text message through a short messaging service.

3. The method of claim 1, further comprising transmitting to the second mobile device for display an offer to purchase the piece of electronic media content for a third mobile device.

4. The method of claim 3, further comprising transmitting to the third mobile device a notification of the purchase of the piece of electronic media content for the third mobile device.

5. The method of claim 1, wherein the first mobile device is a mobile telephone.

6. A method of distributing electronic media content comprising:
   receiving from a first mobile device a first notification that a user of the first mobile device purchased a piece of electronic media content using the first mobile device;
   responsive to receiving the first notification, providing an option to the user of the first mobile device for transmitting a discounted offer for the piece of electronic media content to others;
   receiving a second notification from the first mobile device that the user selected the option along with an identifier of a second mobile device; and
   responsive to receiving the second notification,
      transmitting to the second mobile device the following options: a first option including an offer to purchase electronic media content, a second option including an offer to purchase the electronic content media for another user, and a third option including a request to the user of the first mobile device to purchase the piece of electronic content for a user of the second mobile device,
      upon receiving a notification from the second mobile device that the first option is selected, transmitting the piece of electronic content to the second mobile device,
      upon receiving a notification from the second mobile device that the second option is selected, transmitting a notification to the other user, and
      upon receiving a notification from the second mobile device that the third option is selected, transmitting a request to the user of the first mobile device.

7. The method of claim 6, wherein one or more of the options transmitted to the second mobile device include an electronic link to a server, the server storing a copy of the piece of electronic media content.

8. A non-transitory computer-readable storage medium encoded with executable computer program code for distributing electronic media content, the computer program code comprising program code for:
- receiving from a first mobile device a first notification that a user of the first mobile device purchased a piece of electronic media content using the first mobile device;
- responsive to receiving the first notification, providing an option to the user of the first mobile device for transmitting a discounted offer for the piece of electronic media content to others;
- receiving a second notification from the first mobile device that the user selected the option along with an identifier of a second mobile device;
- responsive to receiving the second notification, transmitting to the second mobile device the following options: the discounted offer for the piece of electronic media content, and an option to transmit the discounted offer to a third mobile device, wherein the discounted offer includes a request to purchase the piece of electronic media content for the second mobile device;
- upon receiving an acceptance notification from the second mobile device in response to the discounted offer, transmitting the piece of electronic media content to the second mobile device;
- upon receiving an acceptance notification from the second mobile device in response to the option to transmit the discounted offer to a third mobile device, transmitting the discounted offer to the third mobile device including the request to purchase the piece of electronic media content for the second mobile device; and
- responsive to receiving an acceptance notification from the third mobile device, transmitting the piece of electronic media content to the second mobile device.

9. The non-transitory computer-readable storage medium of claim 8, wherein transmitting the discounted offer comprises transmitting a text message through a short messaging service.

10. The non-transitory computer-readable storage medium of claim 8, wherein the computer program code further comprises program code for:
- transmitting to the second mobile device for display an offer to purchase the piece of electronic media content for a third mobile device.

11. The non-transitory computer-readable storage medium of claim 10, wherein the computer program code further comprises program code for:
- transmitting to the third mobile device a notification of the purchase of the piece of electronic media content for the third mobile device.

12. The non-transitory computer-readable storage medium of claim 8, wherein the first mobile device is a mobile telephone.

13. The non-transitory computer-readable medium of claim 8, wherein one or more of the options transmitted to the second mobile device include an electronic link to a server, the server storing a copy of the piece of electronic media content.

* * * * *